United States Patent Office 2,781,032
Patented Feb. 12, 1957

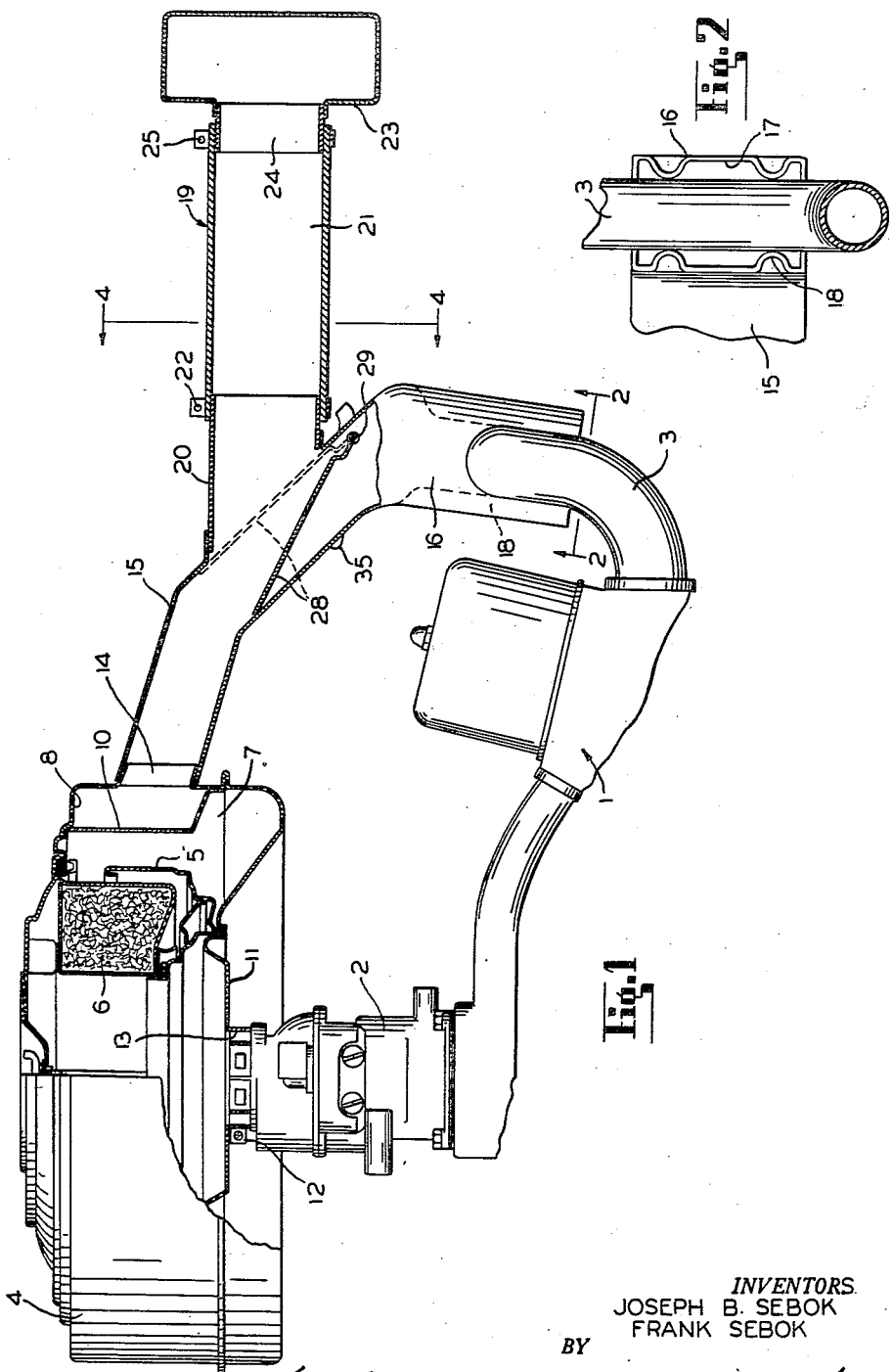

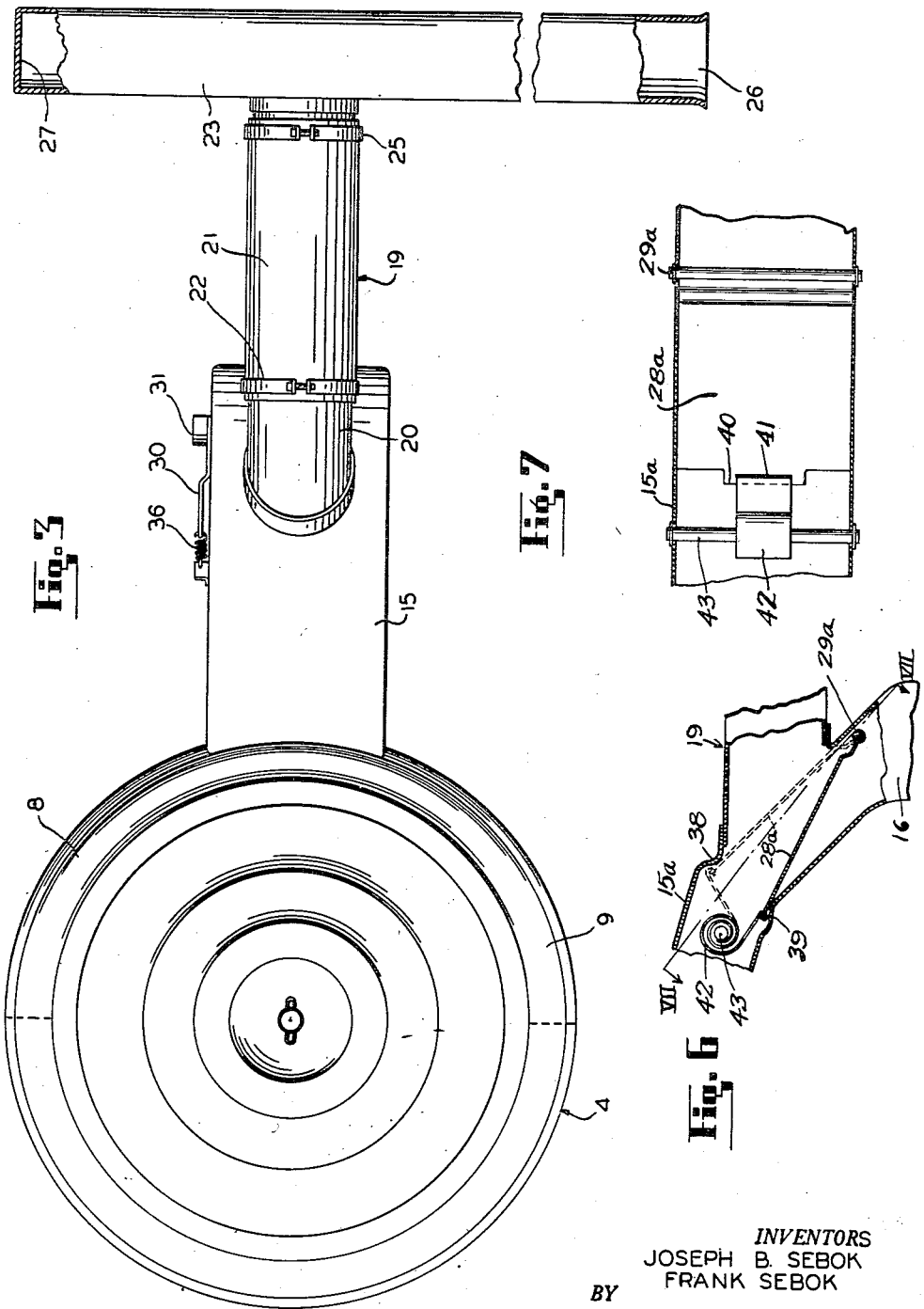

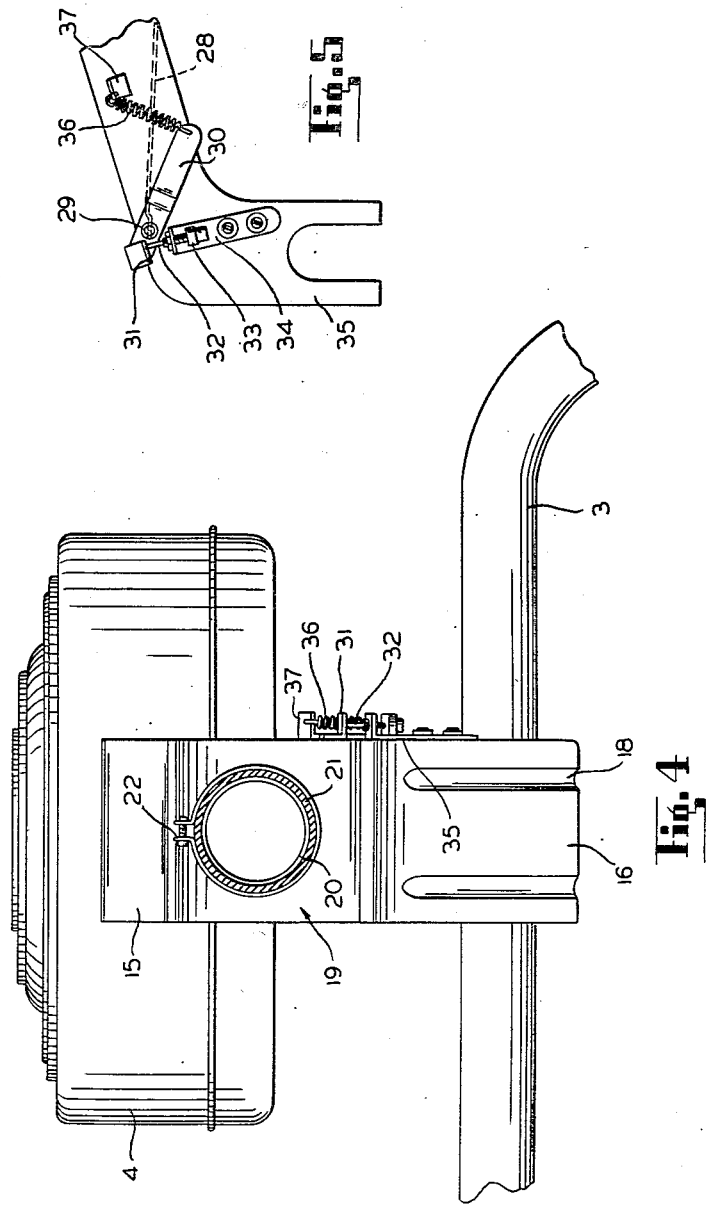

2,781,032

AIR CLEANER ASSEMBLY WITH TEMPERATURE CONTROL

Joseph B. Sebok, Dearborn, and Frank Sebok, Hazel Park, Mich., assignors to Houdaille Industries, Inc., Detroit, Mich., a corporation of Michigan Application November 17, 1954, Serial No. 469,386

12 Claims. (Cl. 123—122)

This invention relates to improvements in an air cleaner assembly with a temperature control, and more particularly to an air cleaner assembly highly useful for association with a carburetor of an internal combustion engine, an air compressor, or other mechanism requiring a supply of clean air for proper operation, the invention also embodying intake silencing means, and having other uses and purposes as will be apparent to one skilled in the art.

In the past, numerous air cleaner-intake silencer assemblies have been provided, particularly for use in connection with internal combustion engines and, of course, the most frequent use of such assemblies were with automotive vehicle engines. In such an installation, the outlet of the air cleaner assembly is connected with the carburetor of the internal combustion engine. While, in the past, the air cleaner as well as the silencing means may have performed their functions to a desirable degree, difficulty was often experienced owing to icing of the carburetor in cold weather, and vapor lock in warm weather, the air cleaner-silencer assembly not helping either of those situations.

In most cases, optimum engine operating conditions occur when the air entering the air cleaner is at a temperature between 70 and 90° F. Icing of a carburetor may occur anywhere between 60° and 25°, depending on humidity. Heretofore, in most cases, air was drawn into the air cleaner from beneath the hood or inside the engine compartment of the vehicle and most of the time such air would not be within the desired temperature range. In some instances, attempts have been made in the past to draw in air from outside the engine compartment of the vehicle, but in no instance of which we are aware has there been any successful control over the temperature of the air entering the air cleaner provided with the air cleaner assembly.

With the foregoing in mind, it is an important object of the instant invention to provide an air cleaner assembly capable of automatically maintaining the air entering the air cleaner within an optimum or predetermined temperature range.

Another object of this invention resides in the provision of an air cleaner assembly which, when utilized with an internal combustion engine, eliminates possible icing of the carburetor during cool weather, eliminates possible vapor lock during warm weather, and aids in maintaining engine efficiency at a desired amount.

It is also a feature of this invention to provide an air cleaner assembly having a divided air inlet leading from sources of air of different temperatures, with means for automatically controlling the amount of air passing through the divisions of the inlet.

Still a further feature of the invention resides in the provision of an air cleaner assembly having divided air inlet means so arranged that when the assembly is utilized with an internal combustion engine in a vehicle or the like, one of the inlet divisions will supply air from a hot source in the engine compartment, while the other division may supply air from a cool source such as externally of the engine compartment, there being means to automatically control the flow of air through each of the inlet divisions.

Another object of the invention resides in the provision of an air cleaner assembly having a divided air inlet arrangement with the divisions thereof leading from sources of air of different temperatures, and temperature responsive control means directly in the path of incoming air to govern the admission of air through either of the divisions.

Still another object of the invention resides in the provision of an air cleaner assembly having a divided air inlet arrangement with temperature responsive means in the path of entering air arranged to block off either division of the inlet, or to admit a portion of the incoming air through each division at the same time, depending upon temperature variations.

It is also an object of this invention to provide an air cleaner-intake silencer assembly with auxiliary silencing means in communication with the air inlet means exteriorly of the casing housing the main silencing and cleansing means.

While some of the more salient features, characteristics and advantages of the instant invention have been above pointed out, others will become apparent from the following disclosures, taken in conjunction with the accompanying drawings, in which—

Figure 1 is a fragmentary part elevational, part sectional view of an air cleaner-intake silencer assembly embodying principles of the instant invention, showing the same operatively associated with an internal combustion engine;

Figure 2 is a fragmentary bottom plan sectional view taken substantially as indicated by the line 2—2 of Fig. 1, looking in the direction of the arrows;

Figure 3 is a top plan view, with parts shown in section, of the air cleaner-intake silencer assembly of Fig. 1;

Figure 4 is a fragmentary vertical sectional view taken substantially as indicated by the line 4—4 of Fig. 1;

Figure 5 is a fragmentary side elevational view of the temperature responsive control means, taken from the right hand central portion of Fig. 4;

Figure 6 is a fragmentary sectional view corresponding in location to the upper central portion of Fig. 1, but illustrating a different form of construction for the temperature responsive control means; and Figure 7 is a fragmentary plan sectional view taken substantially as indicated by the line 7—7 of Fig. 6.

As shown on the drawings:

In the illustrated embodiment of the instant invention, the internal combustion engine has been only diagrammatically illustrated, and only the salient parts of that engine have been shown. With this in mind, the engine is generally indicated by numeral 1, a carburetor 2 is mounted on the engine, and there is an exhaust manifold diagrammatically indicated at 3.

Connected to the intake horn of the carburetor 2 is an air cleaner-silencer assembly comprising a casing 4. Inside the assembly is a liquid cup 5 to contain a quantity of cleansing liquid, and above that cup is an annular filter medium 6. Around the liquid cup the casing is so arranged as to provide a large volume chamber 7 for intake silencing purposes, and a pair of oppositely disposed ducts 8 and 9 defined by an inner arcuate partition 10, extend substantially half way around the inside of the casing. These ducts form what might be called tuning conduits and open abruptly into the volume chamber 7, the length and cross sectional area of the ducts affecting the tuning of the silencing means. By way of example, the air cleaner-silencer element so far described may satisfactorily be of the type more fully set forth, described and claimed in a Joseph B. Sebok and Ralph E. Sendelbach application for patent entitled Air Cleaner and Intake Silencer Assembly, filed February 23, 1954, Serial No. 411,612. The main difference between the air cleaner-silencer unit disclosed herein and that shown in the aforesaid copending application resides in the fact that the instant unit is equipped with a bottom adaptor 11 to fit the unit over a carburetor having an intake horn, the unit being attached by suitable clamp means diagrammatically indicated at 12 around the clean air outlet 13 of the unit.

The casing 4 is also provided with an air inlet opening 14 for contaminated air and to this opening is connected one end of an inlet duct 15 which extends outwardly and downwardly from the casing 4 and terminates an open end portion shaped in the form of a saddle 16 for embracing at least a portion of the exhaust manifold 3, as seen best in Figs. 1, 2 and 4. With reference to Fig. 2 particularly, it will be seen that the saddle 16 is open ended for the admission of air, but has several inwardly depressed portions 18 to contact the exhaust manifold for heat exchange purposes. Thus, any air entering through the saddle 16 of the duct 15 will be heated by virtue of the hot exhaust manifold.

Another inlet duct, generally indicated by numeral 19, connects at an angle with the duct 15, preferably on a sloping portion of that duct 15, as best seen in Fig. 1. The duct 19 in the illustrated instance is fabricated and embodies a connecting nipple 20, a flexible hose 21 connected to the nipple 20 by a suitable clamp member 22, and an elongated transversely extending portion having an intermediate nipple 24 to which the other end of the hose 21 is clamped as at 25.

The transversely extending portion 23 has an open end 26 which preferably projects forwardly out of the engine compartment of the vehicle, so as to take in air exteriorly of the engine compartment. Frequently, two fresh air ducts are provided in automotive vehicles which lead from either side of the radiator in the front, to the body of the car, one or both of these ducts communicating with the heater of the car. The duct portion 23 may extend alongside of one of those ventilating ducts and take in air adjacent the same location air is admitted to the ventilating duct.

The opposite end of the duct portion 23 preferably extends rearwardly beyond the nipple 24 and is closed as indicated at 27. This end portion may therefore function as an auxiliary intake silencer, and may be tuned for the silencing of a sound wave of relatively high frequency by varying the length of the duct portion rearwardly of the nipple 24. In this particular regard, it should also be noted that the divided air inlet arrangement just above described also will have some additional silencing effect as a whole.

Inside one of the branches of the divided air inlet, in the illustrated instance the duct 15, is a flap valve 28, seen best in Fig. 1. This flap valve is of sufficient size to block the flow of air through either duct. As illustrated in this figure, the valve is shown as blocking the flow of air through the outer portion of the duct 15, and admitting air through the duct 19 from the source of cool air. When the valve is moved to the dotted line position seen in this figure, it blocks the flow of air from the cool source, and admits air from the warm source, namely through the saddle portion 16 of the duct associated with the exhaust manifold. Obviously, the valve may be located at an intermediate position permitting the entrance of some air through both of the divisions of the inlet, depending upon ambient temperatures.

The valve is carried at one end thereof on a cross-shaft 29 journaled in the walls of the duct, and having one end fixed to a lever 30 as seen in Fig. 5. Still with reference to Fig. 5, it will be noted that this lever 30 has an outstanding foot 31 at one end for abutting engagement by the plunger 32 of a thermostat 33. The thermostat is mounted in any suitable manner upon an L bracket 34 secured to a bracket 35 which is in turn mounted on the exterior of the duct 15.

The other end of the lever 30 is connected to one end of a tension spring 36, and the other end of the spring is secured to a bracket 37 also secured to the aforesaid bracket 35.

The thermostat may be of any suitable character, responsive to changes in temperature, but is preferably of the type containing a liquid which, upon expansion due to a rise in temperature pushes outwardly upon the plunger 32, and pivots the lever 30 and flat valve 28 toward the position seen in full lines in Fig. 1 and in dotted lines in Fig. 5. The tension spring 36, of course, tends to move the valve in the opposite direction at all times or to the dotted line position of Fig. 1. The thermostat is preferably adjusted to close the division or duct 19 of the divided air inlet when the temperature is below 90° F., and to open the duct 19 and move toward closing of the duct 15 when the temperature reaches 90°. Thus, the temperature of the air delivered inside the casing 4 of the air cleaner-silencer unit may effectively be maintained at the optimum range of between 70 and 90° F.

In operation, the present invention is extremely simple and accurate. Assuming the internal combustion engine to be started, air is drawn into the engine through the air cleaner, and since the temperature at that time is obviously low, the temperature responsive means or thermostat will not be operating against the flap valve, and the tension spring will have drawn that flap valve to the dotted line position of Fig. 1 blocking off the conduit 19 or cold air source, so that warm air, heated by the exhaust manifold is admitted to the air cleaner casing. That warm air will continue to be admitted until the temperature reaches approximately 90°, assuming that the thermostat is set for optimum conditions, and then the thermostat will come into operation and move the flap valve so as to admit air from the cool air source. Thus, there is no possibility of icing of the carburetor, vapor lock, or other adverse conditions adversely affecting the operation of the engine, and the engine will operate at as high as possible an efficiency insofar as aid from the air cleaner-silencer unit is concerned. All parts of the assembly are efficient and automatic in operation, the assembly is highly durable, and, considering the advantageous results performed by it, very economical.

Should additional silencing be desired for relatively high frequency sounds or harmonics, adjustment of the closed end portion of the cold air conduit provides that additional silencing without extra cost in structure.

In that embodiment of the invention illustrated in Figs. 6 and 7, the temperature responsive control means are disposed directly in the path of incoming air, and as illustrated, preferably in the path of incoming air from either of the divisions of the inlet arrangement. The structure seen in Figs. 6 and 7 is particularly advantageous when there is little room in which to mount the structure beneath the hood of an automobile, and where there is danger of injury occurring to an externally mounted temperature responsive control mechanism as above described in connection with Figs. 1 to 5 inclusive.

In this second embodiment, there is a duct 15a, which corresponds to the duct 15, and which is inset on opposite sides thereof as indicated at 38 and 39, which inset construction provides interior seats for a flap valve 28a so that the valve may effectively close either the continuation of the duct 15a, or the duct 19. The flap valve 28a corresponds to the flap valve 28 above described, and is pivotal about a shaft 29a extending through the lower portion of the duct 15. The free end of the flap valve 28a is provided with an extension 40, slotted as at 41 for connection with the temperature responsive element.

In this instance, the temperature responsive element is in the form of a coiled bi-metallic member 42, the inner end of which is connected to a fixed stud or shaft 43 extending across the duct 15a, and the free end of which is engaged in the slot 41 in the flap valve 28a.

In the full line showing of Fig. 6, the bi-metallic element 42 is at the limit of its expansion, and the flap valve 28 is blocking the flow of air from the hot source and admitting only air through the duct 19 from the cold source. The dotted line showing indicates the bi-metallic element 42 fully contracted, with all air from the cold source blocked off, and only hot air being admitted to the air cleaner. Obviously, the valve may be in an intermediate position so as to admit air partially through the extension of conduit 15a and partially through the conduit 19, functioning somewhat as a mixing valve.

As stated above, optimum engine operating conditions apparently occur when the air enters the air cleaner within a range of 70 to 90° F. Accordingly, it is preferable to adjust the bi-metallic element 42 so that when the temperature is less than 70°, the valve will be in the dotted line position of Fig. 6, admitting only hot air from the exhaust manifold. As the temperature responsive element 42 becomes warm, it will tend to expand and between 90° and 110° will remain partly open or in an intermediate position so as to allow both hot and cold air to enter the air cleaner, but when the temperature exceeds 110°, the flap valve will close or move to full line position as viewed in Fig. 6, and admit only cold air. In this manner, the incoming air is maintained within the optimum range of 70 to 90°.

It will be understood that modifications and variations may be effected without departing from the scope of the novel concepts of the present invention.

We claim as our invention:

1. In an air cleaner assembly, an air cleaner, divided air inlet means leading to said cleaner, temperature responsive means controlling the flow of air through said divided inlet means, and intake silencing means carried by one of the divisions of said inlet means.

2. In an air cleaner assembly, an air cleaner, divided air inlet means leading to said cleaner, temperature responsive means controlling the flow of air through said divided inlet means, and intake silencing means incorporated in said inlet means.

3. In an air cleaner assembly, an air cleaner, divided air inlet means leading to said cleaner, temperature responsive means controlling the flow of air through said divided inlet means, and intake silencing means incorporated in said inlet means exteriorly of the air cleaner.

4. In combination, an internal combustion engine having a carburetor and an exhaust manifold, an air cleaner having its outlet connected to the carburetor and including a casing having an inlet opening and containing air cleansing means, divided air inlet means leading to the inlet opening of the air cleaner, one division of the inlet means terminating in proximity to the exhaust manifold, and the other division of said inlet means leading to a source of cool air, and intake silencing means connected to one division of said divided inlet exterior of the air cleaner casing.

5. In combination, an internal combustion engine having a carburetor and an exhaust manifold, an air cleaner having its outlet connected to the carburetor and including a casing having an inlet opening and containing air cleansing means and intake silencing means, divided air inlet means leading to the inlet opening in the cleaner casing, one division of said inlet means being in heat exchange relationship with the exhaust manifold, the other division of the inlet means leading to a source of cool air, and auxiliary intake silencing means connected to one of said divisions externally of the cleaner casing.

6. In an air cleaner and intake silencer assembly, a casing having an outlet for clean air and an inlet opening for contaminated air, air cleaning means in said casing, intake silencing means in said casing, a pair of conduits joined at an angle and connected to said inlet opening, one of said conduits communicating with a source of warm air and the other with a source of cool air, temperature responsive means controlling the air flow through each of said conduits, and auxiliary silencing means communicating with at least one of said conduits exteriorly of said casing.

7. In an air cleaner and intake silencer assembly, a casing having an outlet for clean air and an inlet opening for contaminated air, air cleaning means in said casing, intake silencing means in said casing, a pair of conduits joined at an angle and connected to said inlet opening, one of said conduits communicating with a source of warm air and the other with a source of cool air, and additional silencing means communicating with at least one of said conduits exteriorly of said casing.

8. In an air cleaner assembly, an air cleaner, divided air inlet means leading to said cleaner, valve means governing the flow of air through each division of said air inlet means, and temperature responsive means actuating said valve means and located inside said inlet means adjacent the junction between the divisions thereof.

9. In an air cleaner assembly, an air cleaner, air inlet conduit means leading away from said cleaner and divided into separate branches one of which extends to a source of hot air and the other to a source of cold air, valve means positioned to govern the flow of air through both branches, and a bi-metallic temperature responsive element mounted inside said conduit means adjacent the junction of said branches and connected to said valve to actuate the same.

10. In combination, an internal combustion engine having a carburetor, an air cleaner and intake silencer assembly connected with said carburetor, said assembly having air cleansing means therein and a volume chamber for silencing, tuning conduit means for said chamber having open ends leading into said chamber and through which air entering said assembly travels, divided air inlet means connected to said tuning conduit means between the ends thereof, one division of said inlet means leading to a source of cool air, the other division of said inlet means leading to a source of heated air, and temperature responsive means controlling the flow of air through the divisions of the inlet means.

11. In combination, an internal combustion engine having a carburetor, an air cleaner and intake silencer assembly connected with said carburetor, said assembly having air cleansing means therein and a volume chamber for silencing, tuning conduit means for said chamber having open ends leading into said chamber and through which air entering said assembly travels, divided air inlet means connected to said tuning conduit means between the ends thereof, one division of said inlet means leading to a source of cool air, the other division of said inlet means leading to a source of heated air, temperature responsive means controlling the flow of air through the divisions of the inlet means, and additional silencing means in the form of a closed end extension on one of the divisions of said inlet means.

12. In combination, an internal combustion engine having a carburetor, an air cleaner and intake silencer assembly connected with said carburetor, said assembly having air cleansing means therein and a volume chamber for silencing, tuning conduit means for said chamber having open ends leading into said chamber and through which air entering said assembly travels, divided air inlet means connected to said tuning conduit means between the ends thereof, one division of said inlet means leading to a source of cool air, the other division of said inlet means leading to a source of heated air, valve means controlling the flow of air through the divisions of said divided air inlet means, temperature responsive means located adjacent the junction of the divisions of said air inlet means to actuate said valve means, and additional silencing means connected to one of the divisions of said inlet means.

References Cited in the file of this patent

UNITED STATES PATENTS

| | | |
|---|---|---|
| 1,933,365 | Chandler et al. | Oct. 31, 1933 |
| 2,058,204 | Ball et al. | Oct. 20, 1936 |
| 2,084,991 | Callahan | June 29, 1937 |
| 2,197,503 | Martin | Apr. 16, 1940 |
| 2,369,937 | Baster | Feb. 20, 1945 |
| 2,396,317 | Cutts | Mar. 12, 1946 |
| 2,398,094 | Heymann | Apr. 9, 1946 |